A. C. ROSENBROOK.
ACCELERATOR FOR AUTOMOBILES.
APPLICATION FILED NOV. 3, 1919.

1,385,496.

Patented July 26, 1921.

INVENTOR
August C. Rosenbrook

WITNESSES

ATTORNEY

UNITED STATES PATENT OFFICE.

AUGUST C. ROSENBROOK, OF MADISON, WISCONSIN.

ACCELERATOR FOR AUTOMOBILES.

1,385,496.     Specification of Letters Patent.     Patented July 26, 1921.

Application filed November 3, 1919. Serial No. 335,441.

*To all whom it may concern:*

Be it known that I, AUGUST C. ROSENBROOK, a citizen of the United States, and resident of Madison, in the county of Dane and State of Wisconsin, have invented new and useful Improvements in Accelerators for Automobiles, of which the following is a description, reference being had to the accompanying drawings, which are a part of this specification.

The invention relates to foot controlled accelerators for automobiles and more particularly to one adapted for use on the Ford automobile.

The object of the invention is to provide a foot operated throttle control of simple construction, which may be installed without the necessity of special fitting and drilling of holes in the frame, engine or body, and one in which the parts already in use on a Ford automobile are utilized.

A further object of the invention is to provide a connection between the throttle link and both the steering wheel throttle control and the foot throttle control.

The invention further consists in the several features hereinafter set forth and more particularly defined by claims at the conclusion hereof.

Figure 1:
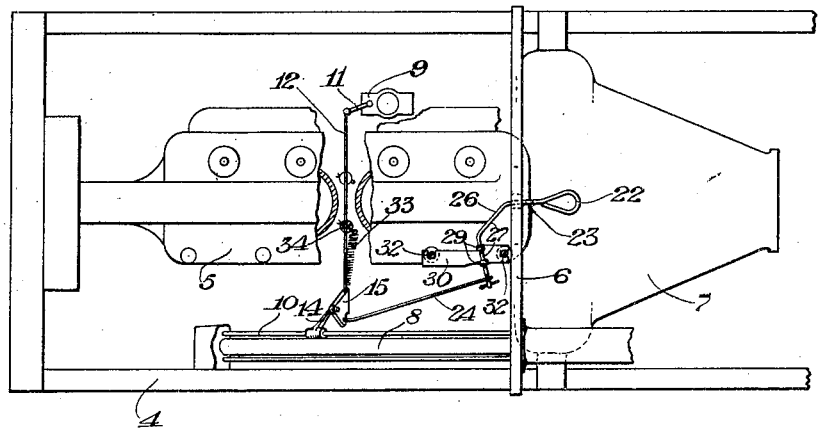
Figure 3:
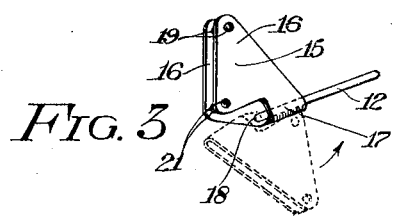
Figure 2:
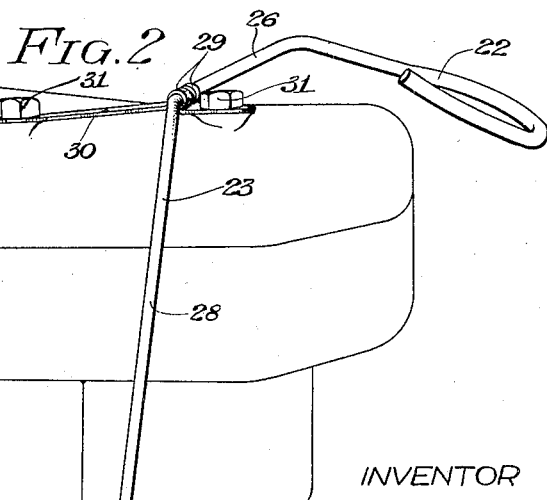

In the drawings: Figure 1 is a plan view of the device embodying the invention, showing it applied to an automobile; Fig. 2 is a perspective view of the device embodying the invention; Fig. 3 is a detail view of the connector.

In the drawings the numeral 4 designates the frame, 5 the engine, 6 the dash, 7 the transmission, 8 the steering column, 9 the carbureter, and 10 the usual throttle control rod adjacent the steering column. The drawing shows these parts as they appear in a Ford automobile and while the device embodying the invention is particularly adapted for this arrangement, it may be used on other types of automobiles.

The usual throttle valve of the carbureter has an arm 11 secured thereto to which a link 12 is connected. In the Ford automobile this link passes through a space between two cylinders and has a bent end 13 which is pivotally connected to the outer end of an arm 14 on the rod 10 so that the throttle is controlled by the turning of said rod by the operator. In the present construction the link 12 is retained and connected to the arm 14 by a connector member 15 which permits operation of the throttle both from the arm 14 and the foot control hereinafter described.

This connector 15 consists of a sheet metal stamping having triangularly shaped sides 16 and a bent portion 17. One of the sides 16 has a hole 18 therein adjacent the portion 17 in which the bent end 13 of the link 14 is inserted when the connector is in the dotted line position shown in Fig. 3, after which the connector is turned around to its full line position shown in said Fig. 3, in which position the portion 17 acts as a stop. The sides 16 have alined apertures 19 receiving a pin 20 which passes through an opening in the arm 14 to pivotally connect said connector 15 with the rod 10 so that the link 12 may be moved on the turning of said rod. The sides 16 also have alined apertures 21 spaced from the apertures 19 and 18.

A foot pedal 22 is formed integral or connected to a lever 23 at one end, which lever is pivotally connected at its other end to the eyed end of a link 24. The other end of this link 24 has a bent portion 25 pivotally mounted in the apertures 21 in said connector. The lever 23 is of such a shape as to permit the pedal 22 to be passed through the usual opening in the dash 6 of a Ford automobile beneath the coil box and to be pivotally mounted upon the cylinder head of the engine 5. To this end the lever 23 has a downwardly and laterally inclined portion 26, a horizontally extending portion 27 and a vertically extending portion 28. The portion 27 is pivotally mounted in ears 29 formed in a plate 30 which is secured to the cylinder head adjacent the dash by two of the cylinder head bolts 31, the plate having slots 32 in its ends so that it may be slipped beneath the heads of the bolts when they are slightly unloosened and then be clamped between the cylinder head and bolts when said bolts are tightened up.

A spring 33 secured to the link 12 and to a bolt 34 on the engine frame returns the link 24 and lever 23 to normal position on a release of pressure upon the pedal 22.

With the device above described, the throttle may be controlled in the usual manner by turning the rod 10, which action reciprocates member 16 and link 12 to effect a turning of the crank 11, or it may be controlled by pressing down on the pedal to swing the lower end of the lever 23 forward, thereby moving the link 24 forward, which swings the member 16 about the pin 20 as a pivot, which action causes the link 12 to turn the crank 11. Thus the member 16 acts as a link connector between crank 14 and link 12 and between link 24 and link 12.

From the above description it will be noted that the device may be installed without special fitting, that there is no necessity for drilling holes in the frame, body or engine to attach the device, and that both the crank 14 and link 12 form a part of the device. The device may be manufactured very cheaply and quickly applied to a Ford automobile by an unskilled mechanic.

What I claim as my invention is:

1. In an automobile, the combination, with the arm on the rotatable throttle control rod and the link operatively connected with the throttle, of a member pivotally connecting said arm and link together and having a stop portion adjacent the pivot connection of the link with said member, a foot operated lever, and means connecting said lever to said member.

2. In an automobile, the combination of the arm on the rotatable throttle control rod, a foot operated lever, a throttle link, and a member having connection with said arm, lever and link, said member having a stop portion to limit the swinging movement of said link in one direction.

In testimony whereof, I affix my signature in presence of two witnesses.

AUGUST C. ROSENBROOK.

Witnesses:
E. J. FISHER,
MATHILDA M. POOLE.